United States Patent
Pinkerton et al.

(10) Patent No.: US 6,512,305 B1
(45) Date of Patent: Jan. 28, 2003

(54) METHOD AND APPARATUS HAVING A TURBINE WORKING IN DIFFERENT MODES FOR PROVIDING AN UNINTERRUPTIBLE SUPPLY OF ELECTRIC POWER TO A CRITICAL LOAD

(75) Inventors: Joseph F. Pinkerton, Austin, TX (US); David B. Clifton, Leander, TX (US)

(73) Assignee: Active Power, Inc., Austin, TX (US)

( * ) Notice: Subject to any disclaimer, the term of this patent is extended or adjusted under 35 U.S.C. 154(b) by 0 days.

(21) Appl. No.: 09/595,101

(22) Filed: Jun. 16, 2000

Related U.S. Application Data

(63) Continuation-in-part of application No. 09/318,728, filed on May 26, 1999, now Pat. No. 6,255,743.

(51) Int. Cl.$^7$ .............................. H02P 9/04; B60L 1/02; F01C 3/00; H02C 6/00; H02K 7/18
(52) U.S. Cl. ..................... 290/52; 290/1 A; 290/1 B; 290/2; 290/4 R; 290/30 A; 290/46; 290/52
(58) Field of Search .................. 290/52, 40; 60/39.02, 60/39.07, 226.01, 39.281, 39.01

(56) References Cited

U.S. PATENT DOCUMENTS

| | | | |
|---|---|---|---|
| 3,187,188 A | 6/1965 | Adkins et al. | |
| 3,844,113 A | * 10/1974 | Lockwood, Jr. | 60/39.15 |
| 3,978,657 A | * 9/1976 | Fulton et al. | 60/39.12 |
| 3,999,377 A | * 12/1976 | Oklejas et al. | 60/39.51 |
| 4,059,770 A | 11/1977 | Mackay | 290/4 |
| 4,077,748 A | 3/1978 | Pötz | |
| 4,224,797 A | * 9/1980 | Kelly | 60/652 |
| 4,295,334 A | 10/1981 | Johnson | 60/669 |
| 4,402,647 A | 9/1983 | Effenberger | 415/90 |
| 4,444,444 A | 4/1984 | Benedetti et al. | |
| 4,455,614 A | * 6/1984 | Martz et al. | 364/494 |
| 4,517,471 A | * 5/1985 | Sachs | 307/67 |
| 4,652,207 A | 3/1987 | Brown et al. | 415/90 |
| 4,655,679 A | 4/1987 | Giacomel | 415/90 |

(List continued on next page.)

FOREIGN PATENT DOCUMENTS

| | | |
|---|---|---|
| DE | 198 33 420 C | 10/1999 |
| JP | 0 734 113 A | 9/1996 |
| JP | 10 257696 | 9/1998 |
| JP | 2001404165 A * | 5/2001 |

*Primary Examiner*—Nestor Ramirez
*Assistant Examiner*—Julio C. Gonzalez
(74) *Attorney, Agent, or Firm*—Fish & Neave; Robert W. Morris; George L. Kanabe

(57) ABSTRACT

An uninterruptible power supply (UPS) system supplies power to computers, medical apparatus or other critical loads when primary power supply falters. The UPS system includes an electrical machine connected to a turbine that can be rotated by a motive fluid from a fluid supply. The electrical machine can be a dual purpose electrical machine (a motor/generator) or a two unit machine (one motor and one generator in a single housing or in separate housings) connected to the turbine. When power is supplied from the primary power supply to the critical load, the electrical machine acts as a motor to rotate the turbine and energy is stored by the turbine rotor in the form of rotational momentum. When power from the primary power supply falters, the rotational momentum of the turbine rotor initially rotates the electrical machine which acts as a generator to provide power to the critical load. If the power loss or failure is extended, the turbine motor is driven by combustion products, steam, compressed gases or other motive fluids to maintain the rotary motion of the turbine and the generator. Numerous methods and apparatus are also described for reducing system losses and improving overall efficiency.

73 Claims, 11 Drawing Sheets

U.S. PATENT DOCUMENTS

| | | | |
|---|---|---|---|
| 4,686,375 A | * 8/1987 | Gottfried | 290/2 |
| 4,754,607 A | * 7/1988 | Mackay | 60/723 |
| 4,935,650 A | 6/1990 | Hannan, III | 310/11 |
| 5,434,454 A | 7/1995 | Farkas | 290/4 R |
| 5,536,976 A | 7/1996 | Churchill | 307/11 |
| 5,553,454 A | 9/1996 | Mortner | 60/409 |
| 5,748,500 A | * 5/1998 | Quentin et al. | 364/551.01 |
| 5,969,435 A | * 10/1999 | Wilhelm | 307/64 |
| 6,031,294 A | 2/2000 | Geis et al. | 290/52 |
| 6,032,459 A | 3/2000 | Skowronski | 60/39.511 |
| 6,064,122 A | 5/2000 | McConnell | 290/32 |
| 6,093,975 A | * 7/2000 | Peticolas | 290/52 |
| 6,153,943 A | * 11/2000 | Mistr, Jr. | 290/52 |
| 6,170,251 B1 | * 1/2001 | Skowronski et al. | 60/39.02 |

* cited by examiner

METHOD AND APPARATUS HAVING A TURBINE WORKING IN DIFFERENT MODES FOR PROVIDING AN UNINTERRUPTIBLE SUPPLY OF ELECTRIC POWER TO A CRITICAL LOAD

CROSS-REFERENCE TO RELATED APPLICATION

This application is a continuation-in-part of U.S. patent application Ser. No. 09/318,728, filed May 26, 1999, which is incorporated by reference in its entirety.

BACKGROUND OF THE INVENTION

This invention relates to uninterruptible power supply (UPS) systems. In particular, the present invention relates to UPS systems that provide electric power to critical loads when primary power supplies fail, or when deterioration occurs in the power being supplied to the end user.

UPS systems are widely used to assure that, when a primary power supply fails due to equipment malfunction, downed lines or other reasons, electric power continues to be supplied to critical loads, such as hospital operating room equipment, computer systems and computerized manufacturing equipment. UPS systems avoid equipment failures, costly downtime and equipment damage, as well as providing necessary power that otherwise would not be available.

UPS systems traditionally take two basic forms, inverter-based and rotary. A typical inverter-based UPS system has a utility-powered rectifier connected to a DC bus which charges a string of chemical storage batteries. When the primary power supply fails, electronic circuitry converts direct current (DC) from the batteries into alternating current (AC) which operates the critical load. In an off-line or line-interactive UPS, this AC output is used to power the critical load only whet power is unavailable from the primary power supply. In a double conversion UPS (where utility power is converted from AC to DC and back to AC), the AC output provides power to the critical load at all times.

A typical rotary UPS uses a motor which drives a generator. The generator supplies alternating current to the critical load at all times. The motor is typically a DC motor that is driven during normal operations by rectified DC from the primary power supply, and driven during primary power supply interruptions by a battery string. During very brief power interruptions, the rotational momentum of the motor and generator can supply power to the critical load.

For inverter-based and rotary UPS systems, flywheel systems are available as a clean and reliable alternative or complement to chemical batteries. Such flywheel systems include a flywheel connected to an electrical machine which can operate as a motor and as a generator. For example, U.S. Pat. No. 5,731,645 describes flywheel systems that provide backup power to the load in UPS systems. The electrical machine is powered by the DC buss to operate as a motor when acceptable power is being received from the primary power supply. When power from the primary power supply fails, the electrical machine is rotated by the kinetic energy of the flywheel, and it acts as a generator to supply power to the DC buss.

Large UPS systems in the range of 20 KW to 2 MW often use prime movers (fuelburning engines) to drive backup generators during prolonged power outages. The prime movers are costly and complicated, and they require extensive ongoing maintenance. The engines may fail to start, resulting in loss of power to the critical load. In some localities, ordinances limit the running time or the number of starts per year of the engines for backup generators, which limits testing and overall usefulness of such systems.

Energy storage systems currently used to provide power to a DC buss are expensive and complicated. In battery energy storage systems, there is a risk that undetected battery damage or corrosion of battery terminals will result in a failure to deliver power when needed. Batteries have a limited life and they require expensive ventilation, drainage, air conditioning and frequent maintenance. Flywheel energy storage systems, while avoiding most disadvantages of batteries, are expensive since they are mechanically complex and they require complicated power electronics.

In some existing systems, power from the primary power supply is rectified and transmitted to a DC buss, converted to low frequency AC by a converter, and used to power a critical load. The associated UPS systems have a high speed gas turbine and a backup generator driven by the turbine. The backup generator is a brushless permanent magnet alternator which generates high frequency AC which is rectified and transmitted to the DC buss. The DC output buss provides power to an inverter, and the inverter converts the DC to a low frequency AC which powers the critical load. When the power from the primary power supply is present, the turbine rotor is stationary. When a brief outage occurs, a battery string supports the DC buss. When there is an extended power failure, a battery is connected to the generator which then, acting as a motor, brings the turbine rotor up to speed. When a predetermined minimum speed is attained, fuel is supplied to the gas turbine to sustain the rotation of the turbine, and power from the generator is supplied to the DC buss. Such systems are expensive and complicated compared to the present invention because they require a separate energy storage system.

A primary object of the present invention is to provide a UPS which is less complicated and less expensive than existing battery/generator/turbine UPS systems of the type described above.

Another object of the present invention is to provide UPS systems that include a gas turbine having minimal losses during idle periods.

A further object of the present invention is to provide UPS systems that include a gas turbine in which compressor thrust is significantly reduced to improve the life of the bearings.

A still further object of the present invention is to provide UPS systems that include a gas turbine configured with magnetic rotor weight unloading to lower system costs and improve system performance.

SUMMARY OF THE INVENTION

In one respect, the method of the invention is performed by supplying electric power from said primary power source to said motor means to rotate said turbine rotor which stores kinetic energy as rotational momentum; and, operating said apparatus in an emergency mode in which said machine rotor is rotated by rotational momentum of said turbine rotor to supply electric power to a critical load.

Preferably, the turbine rotor includes a plurality of parallel discs which are separated by spaces, and the method includes the step of introducing motive fluid from the fluid supply into peripheral regions of said spaces to rotate said turbine rotor. The motive fluid may be provided by many means, including but not limited to: (1) burning a fuel to produce an exhaust gas, and using said exhaust gas as said motive fluid (2) providing a source of compressed gas, and using said compressed gas as said motive fluid, or (3) boiling water to produce steam, and using said steam as said motive fluid.

According to the preferred method, the primary power source is disconnected from the critical load when the primary power source fails. The electric power supplied to the critical load may be direct current or alternating current.

In another respect, the method of the invention is performed by supplying electric power to a rotary electrical machine which is operating in a motor mode, while transmitting rotational motion from said electrical machine to a rotor of a turbine whereby said rotor stores kinetic energy in the form of rotational momentum; transmitting said rotational momentum of said rotor to said electrical machine when the primary power source fails; and, operating said electrical machine in a generator mode to supply electric power to said critical load. Preferably, a flow of motive fluid to said rotor is directed to the rotor to prevent its rotational deceleration.

In yet another respect, the method of the invention includes the steps of (1) operating an apparatus in a non-emergency mode in which power is supplied from the primary power supply to said electrical machine, said fluid supply is inactive, and said electrical machine rotates said turbine rotor which stores kinetic energy as rotational momentum; and, (2) activating said fluid supply to direct motive fluid to the turbine rotor to sustain rotation of the turbine rotor and the electrical machine rotor to generate electric power which is supplied to the critical load. Preferably, after the primary power supply has failed and before the fluid supply is activated, the apparatus is operated in a TRANSITIONAL mode in which rotational momentum, of said turbine rotor rotates said electrical machine rotor to generate electric power which is supplied to the critical load.

When the electrical machine has a motor unit and a generator unit which have separate windings from each other, and the apparatus is operating in its non-emergency mode, said motor unit drives said generator unit, and said generator unit generates electric power for the critical load. When said electrical machine includes a dual purpose unit which operates as a motor at some times and as a generator at other times, said unit is operated as a motor when the apparatus is in its non-emergency mode and it is operated as a generator when the apparatus is in its emergency mode.

In another preferred embodiment, air drag on the inactive turbine is reduced during idle periods by sealing the turbine housing and either evacuating it, or purging the housing with a light gas, such as helium. In this configuration, solenoid valves, for example, could be used to admit working-fluid and allow exhaust gases to escape once the turbine was activated. In addition, if a shaft-mounted compressor is included, the compressor could be kept in INACTIVE mode while the turbine was inactive to further reduce losses. When working fluid is introduced into the turbine, air would also be introduced into the compressor, so that both components enter ACTIVE mode. Persons skilled in the art will appreciate that it may be advantageous to keep a portion of the housing, for example, the electric motor/generator section, evacuated or purged with a light gas even while in ACTIVE mode.

Other preferred embodiments of the present invention may include, for example, the use of magnetic bearings to unload the weight of the turbine (this would also permit the use of relatively inexpensive grease-lubricated bearings); a power turbine configured in two parts to cancel thrust load while routing exhaust to the center of the turbine, thereby reducing shaft temperature at the bearings; a two-part power turbine configured in unequal parts (where each part provides a different amount of thrust load), so that the extra thrust load of one part cancels out the thrust load of the compressor; a variable housing spacing around the compressor (controlled by, for example, a magnetic bearing) that increases housing clearance during periods of inactivity for reduced drag; the compressor may be used as a vacuum pump to evacuate the turbine housing as described above.

DETAILED DESCRIPTION

Figure 1:
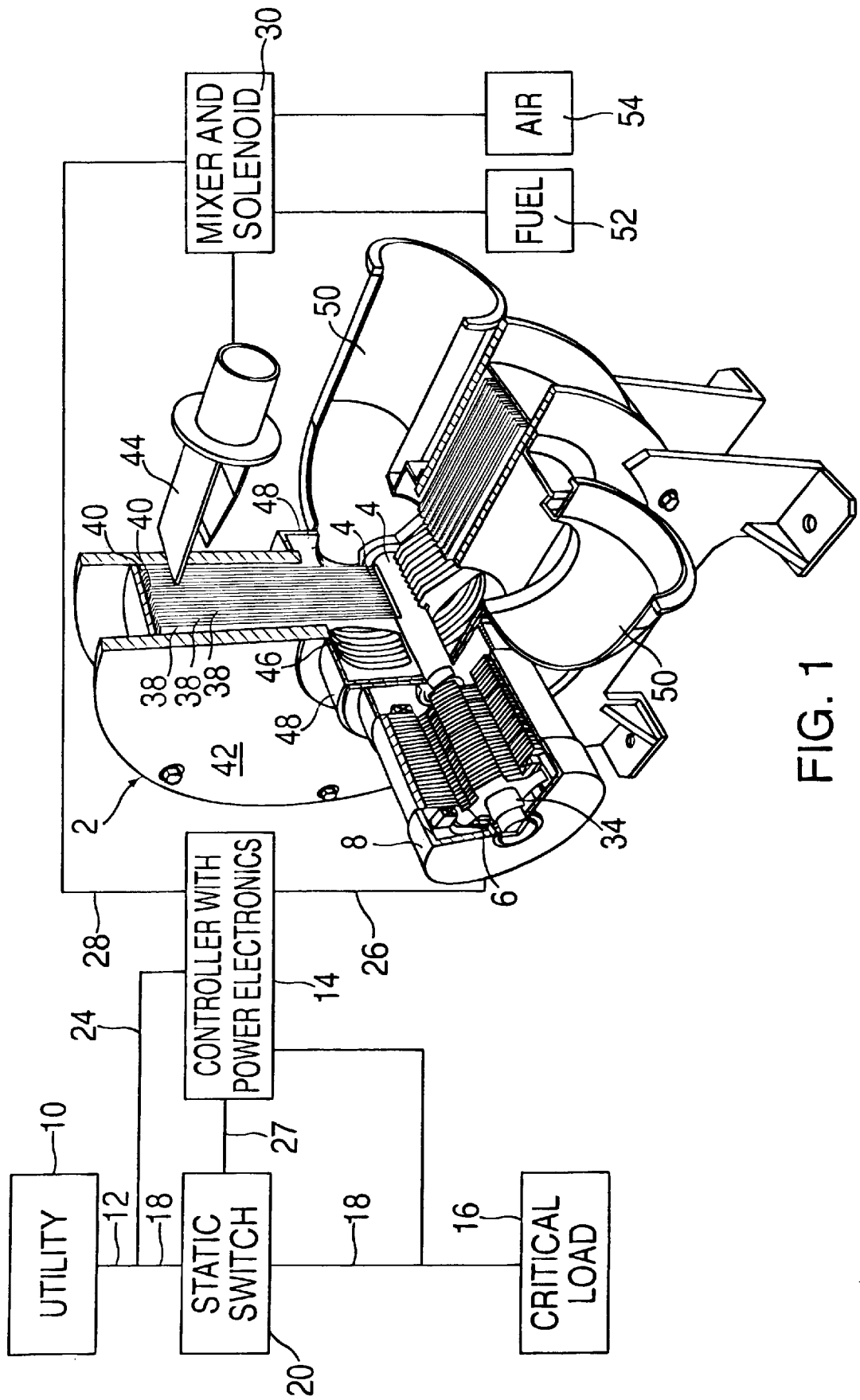
FIG. 1 is a schematic view of a first embodiment of the invention, including a fragmentary view of a preferred turbine design.
Figure 9:
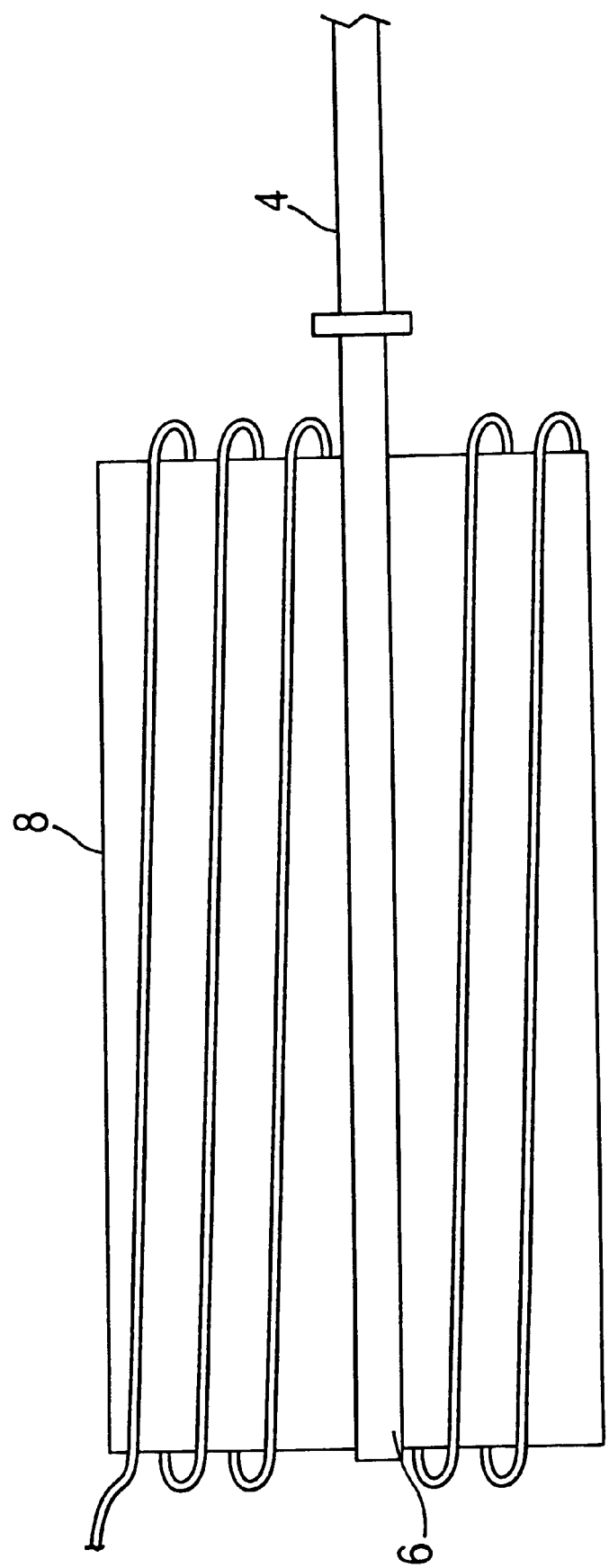
FIG. 9 is a schematic view of a rotary electric machine having a single set of windings in accordance with the principles of the present invention.

In the system of FIG. 1, a turbine 2 has its rotor 4 drivingly connected to the rotor 6 of a rotary electrical machine 8 which is operable, at different times, as a motor and as a generator. The shafts of the turbine rotor 4 and the electrical machine rotor 6 are coupled together, either directly or indirectly by gearing or other means, so that the electrical machine rotor 6 can drive the turbine rotor 4, and the turbine rotor can drive the electrical machine rotor. Many kinds of motor/generator machines B can be used but, due to their simplicity and low cost, switched reluctance machines and homopolar inductor alternator machines are preferred. Additionally, a machine 8 in accordance with the principles of the present invention may incorporate a single set of windings (see FIG. 9), separate windings (see FIG.

10), or any other suitable type of winding configuration in order to allow it to operate, at different times, as a motor and as a generator.

The primary power supply represented schematically by box 10 in FIG. 1 can be an electric utility, a cogenerator, a small power producer, or a user-operated system; and it can include generation facilities, transmission lines, distribution networks and other components known in the industry.

At the end user's site, there is a controller 14 and a critical load 16 (a computer system, automated manufacturing equipment, etc.) which normally receives electric power from the primary power supply via the distribution line 12, a local conductor 18, and a normally closed static switch 20. The controller 14 includes power electronics of a type known in the art which can drive the electrical machine at a variable frequency. The power electronics can also receive power from the electrical machine at a variable frequency and convert it to a constant frequency to power the critical load.

The controller 14 has an input line 24 connected to the transmission line, a power line 26 connected to the motor/generator 8, a control line 27 connected to the static switch 20, and a control line 28 connected to a combustion system 30. The combustion system 30 and the nozzle 44 constitute a fluid supply which is normally inactive but is capable, when activated, to direct a flow of motive fluid (exhaust gases) against the turbine rotor 4 to rotate the turbine.

Preferably, the turbine 2 is a Tesla turbine of the type disclosed An U.S. Pat. No. 1,061,206, the contents of which are incorporated herein by reference. The Tesla turbine 2 shown in FIG. 1 has a rotor shaft 34 and a plurality of parallel discs 38 which are rotationally fixed to the shaft and are separated by annular spaces 40. A stationary housing 42 encloses the discs. A fluid supply includes a tangential nozzle 44 for introducing steam, combustion products, or other motive fluids tangentially into the housing 42, and into the peripheral regions of the spaces 40 between the discs 38. The boundary layer effect of the motive fluid on the surfaces of discs 38 rotates the turbine rotor, and the fluid moves in an inward spiral toward the turbine shaft. The fluid exits from the spaces 40 via aligned exhaust holes 46 in the discs, and it flows into opposed exhaust chambers 48 which lead to exhaust conduits 50. Axial thrust on the rotor is minimized by using this opposed dual exhaust system. If desired, a flywheel may be mounted on the turbine shaft to provide a greater moment of inertia and angular momentum.

Combustion products are the preferred motive fluid for the turbine. Such combustion products are generated by the combustion system 30 which receives and mixes fuel and air from a fuel supply 52 and an air supply 54. The combustion system ignites and burns the fuel, and the resulting exhaust gases are directed by the turbine nozzle 44 against the turbine rotor to drive the turbine.

The turbine system may have conventional components known in the art, including compressors for fuel and air, igniters, separate combustion chambers, cooling systems and various devices such as recuperators that are used to improve turbine efficiency.

The Tesla turbine has a number of advantages over traditional bladed turbines, including: simplicity of construction, low cost, high tolerance for particulate contaminants in the air and fuel, reduced maintenance requirements, low audible noise, adaptability for use with multiple fuels, low rotor stress concentrations, high moment of inertia per unit of mass, high moment of inertia per unit of volume, ability to operate at higher tip speeds, ability to store more energy as angular momentum, and reduced thrust bearing requirements when opposed dual exhausts are used.

When the primary power supply is functioning normally, the static switch 20 is on, and the critical load 16 is powered by the primary power supply through the static switch 20. Power from the primary power supply also powers the controller 14 and the motor/generator machine 8 which acts as a motor to keep the turbine 2 rotating against windage and bearing losses. The turbine rotor stores kinetic energy as rotational momentum.

When the controller 14 detects a failure in the primary power supply, as when there is a total power loss or when the waveform does not satisfy specifications determined by firmware, software or both, the controller 14 changes the signal in line 27 to turn off the static switch 20, and the UPS system then operates in a TRANSITIONAL mode in which the rotational momentum of the turbine rotor 4 rotates the rotor of the electrical machine 8.

The output of generator 8 will have a high frequency which will decrease as the rotor slows down due to dissipation of angular momentum. The controller 14 includes known power electronic circuitry which converts the generator output to standardized alternating current which has a voltage and a frequency corresponding to those normally provided by the primary power supply to the critical load, typically 60 Hz. When the system is operating in the TRANSITIONAL mode, no energy is supplied to the turbine, and the combustion system 30 is inactive.

After the turbine rotor 4 has decelerated to a predetermined angular velocity due to dissipation of its rotational momentum, the controller 14 sends a signal via line 28 to activate the combustion system 30. The combustion system ignites a fuel-air mixture to produce exhaust gases in a manner well known in gas turbine technology. These exhaust gases are directed against the rotor by the nozzle 44, and they act as a motive fluid to rotate the turbine rotor 4 and the coupled electrical machine rotor 6 which continue to generate electric power for the critical load 16 until the fuel supply is exhausted.

Figure 2:
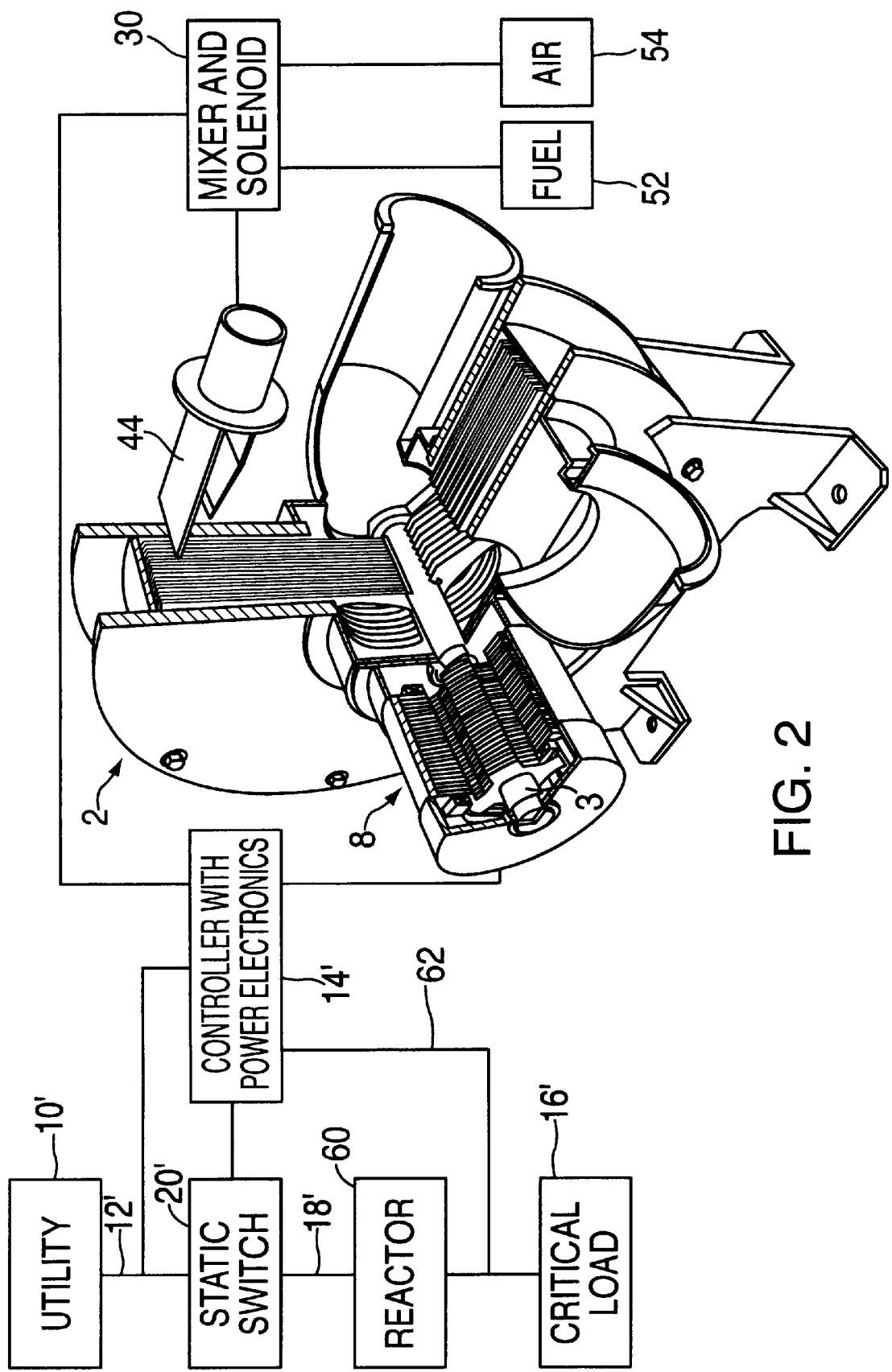
FIG. 2 is a schematic view of a second embodiment of the invention which is similar to the embodiment of FIG. 1 but includes circuitry for correcting small disturbances in the power from the primary power supply by making waveform injections into the power transmitted to the critical load.

The embodiment of FIG. 2 is similar in most respects to the apparatus shown in FIG. 1, but it has a reactor 60, usually an inductor, in the local conductor 18' which connects the static switch 20' to the critical load 16'. The controller 14' in FIG. 2 performs the same functions as the controller 14 in FIG. 1. It makes line interactive corrections when there are small disturbances to the power received from the distribution line 12'. The controller 14' detects these disturbances, and its power electronics generate a corrective waveform which, as is known in the art, is injected by line 62 into the local conductor 18' on the load side of the reactor 60. Energy for these injections can come from the distribution line 12' to the controller 14', from small energy storage elements such as capacitors in the controller 14' and from the angular momentum of the turbine when the electrical machine 8 operates briefly as a generator.

It is believed that the systems of FIGS. 1 and 2 will achieve efficiencies of about 98% while powered by the primary power supply. The only losses are attributable to electrical spinning of the turbine and to dissipation in the static switch and reactor. Air pollution caused by the turbine exhaust is substantially lower than that from a typical diesel engine, so longer legally permissible running times are possible. Turbines fired by natural gas or propane are typically allowed to operate indefinitely.

Figure 3:
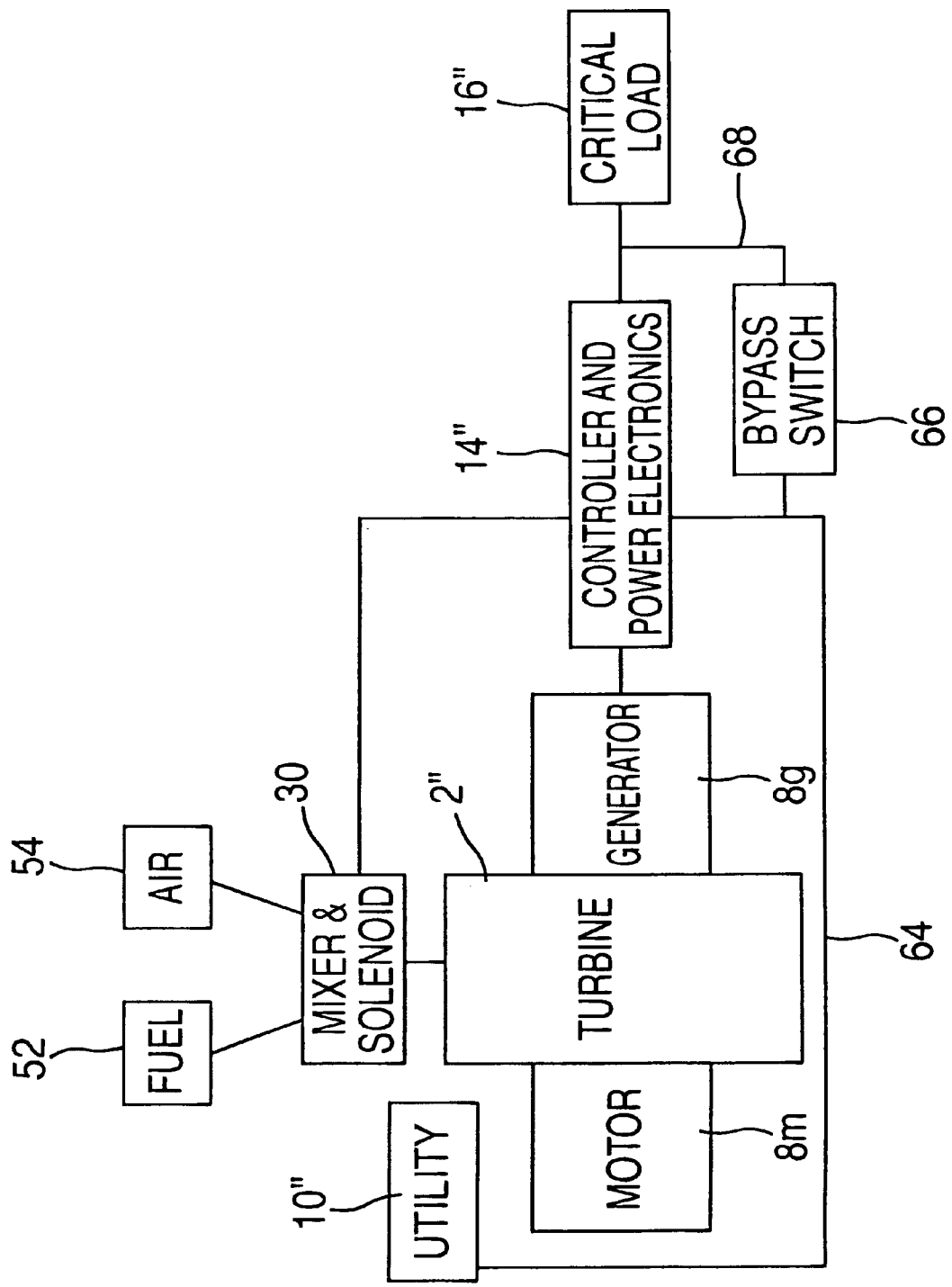
FIG. 3 is a block diagram of a third embodiment of the invention in which the UPS is on-line in the respect that it supplies power to the critical load when suitable power is available and when the primary power supply has failed.

FIG. 3 is a block diagram of a third embodiment of the invention. This is an on-line UPS system in which the load 16" is completely isolated from the waveform properties of the primary power supply 10" at all times. In this embodiment, the electrical machine includes the motor unit 8m and a generator unit 8g which are located on opposite sides of a conventional gas turbine 2". The shafts of the motor unit 8m, gas turbine 2" and generator unit 8g are drivingly connected together. The motor unit has rotor and stator windings which are independent from the rotor and stator windings of the generator unit. The motor and generator units are shown in separate housing but, if desired, they can be in a single housing. The motor and generator units 8m, 8g simultaneously perform their respective functions as a drive motor and as an electrical generator.

The motor 8m is driven by power from the primary power supply 10" and it keeps the turbine 211 spinning while the primary power supply is "up". If switched reluctance or high frequency (greater than 60 Hz) homopolar inductor alternator machines are used, a power electronics drive is used because such machines cannot be directly connected to the primary power supply. The output of generator 8g powers the critical load 16" at all times.

Some of the electronics can be omitted from the controller 14" in situations which do not require precise frequencies and voltages. For example, a turbine with a high angular momentum may be driven at a speed which causes the generator output to be at a desired frequency such as 60 Hz. If the primary power supply fails, the rotational momentum of the turbine rotor and any flywheel which may be attached to it will be great enough to maintain a near-60 Hz frequency and in acceptable voltage until the turbine combustion system is activated.

Figure 10:
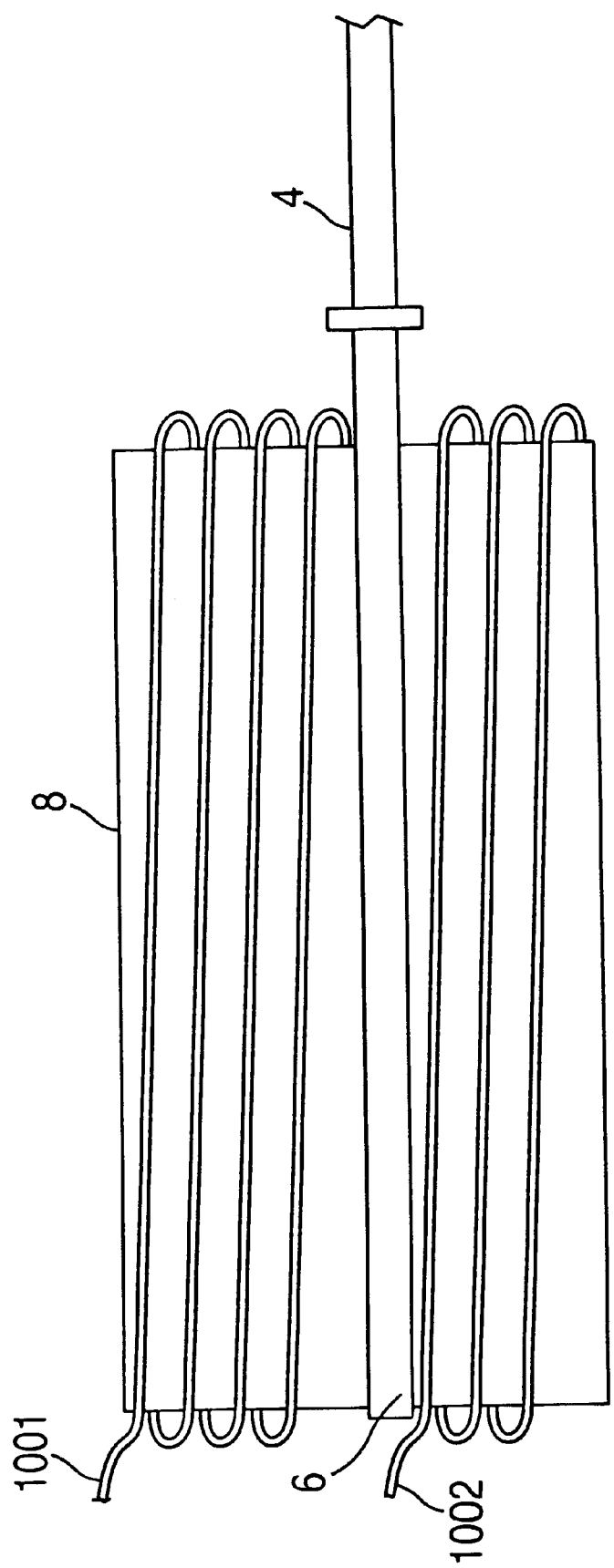
FIG. 10 is a schematic view of a rotary electric machine having separate windings in accordance with the principles of the present invention.

The controller 14" normally has power conversion electronics which convert the generator's output to clean sinusoidal AC at the normal frequency and voltage of the primary power supply. The power converter electronics are always "warmed up" and driving the full power of the load. Although FIG. 3 shows the motor 8m and generator 8g as separate entities on opposite sides of the turbine, they can be incorporated into a single machine with separate windings (e.g., windings 1001 and 1002 of FIG. 10) or other arrangement which enable it to operate simultaneously as a motor and generator.

If the UPS system of FIG. 3 fails or requires maintenance, power from the primary power supply 10 can optionally bypass the motor/turbine/generator set and be fed directly to the critical load 16. Such bypass power is fed from the primary power supply via lines 64 and a bypass switch 66.

The motor 8m in the embodiment of FIG. 3 may be a standard inexpensive induction motor driven directly by the primary power supply. If the turbine rotor has a sufficiently high moment of inertia relative to the output torque of motor unit 8m, the motor unit 8m may be electrically connected to the primary power source by a variable speed drive (VSD), not shown, which is used when the turbine rotor is accelerated from a dead stop to its normal operational velocity. Once the VSD brings the rotor to speed, a relay connects the motor 8m directly to the primary power supply for efficient full-power operation. This relay is open during primary power supply outages.

The on-line configuration shown in FIG. 3 is believed by some users to achieve the ultimate in power quality and reliability. However, it is more expensive than the embodiments shown in FIGS. 1 and 2 because it requires two rotating electrical machines or one larger machine capable of continuous simultaneous operation as a motor and as a generator at the rated power. The efficiency of this configuration is typically 90 to 94%. This is lower than the efficiency of the embodiments of FIGS. 1 and 2 because, in the FIG. 3 embodiments, the two rotating electrical machines operate continuously at their rated power.

Figure 4:
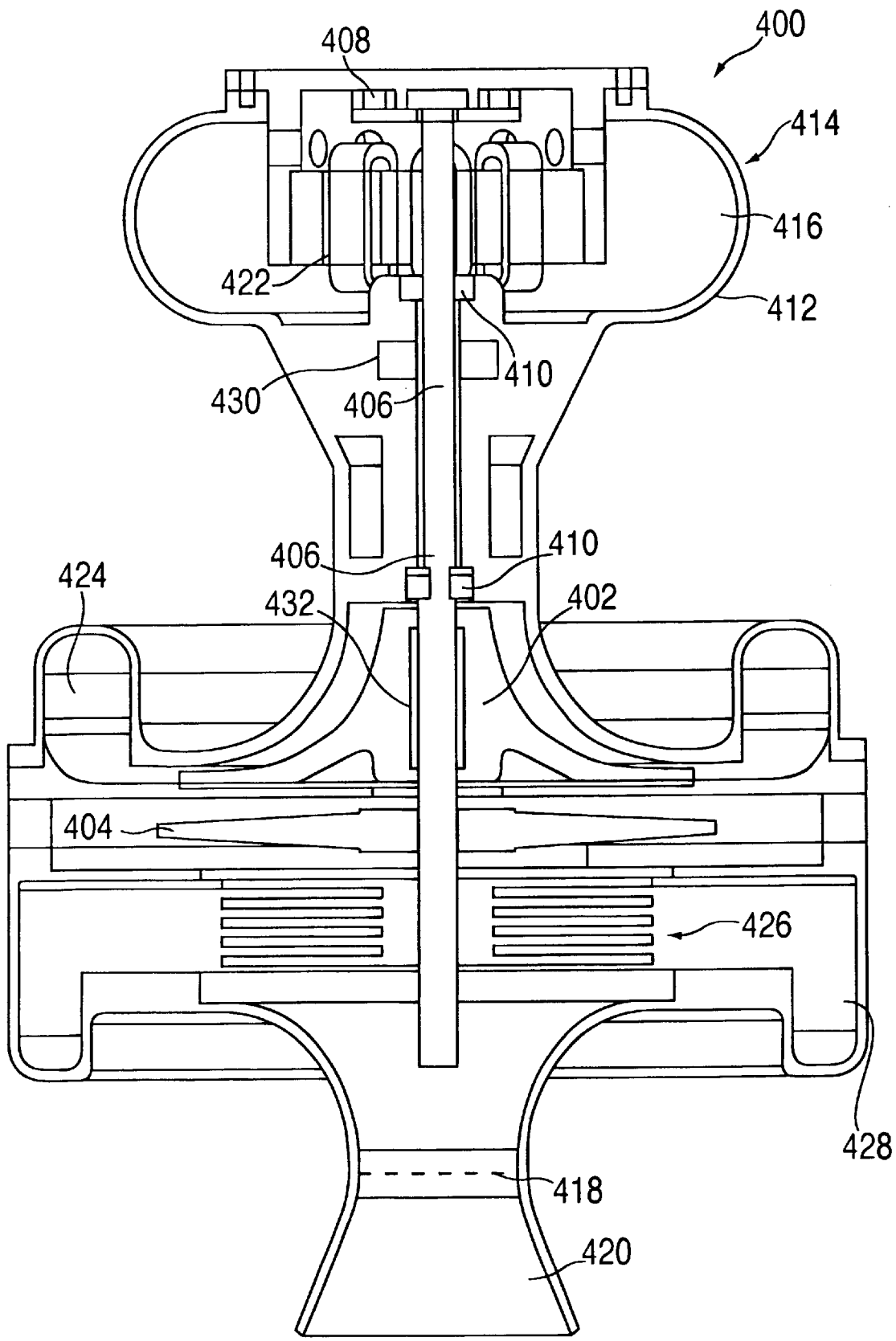
FIG. 4 is a schematic view of another preferred embodiment of the present invention in which a gas turbine and compressor are mounted on a vertical shaft.
Figure 5:
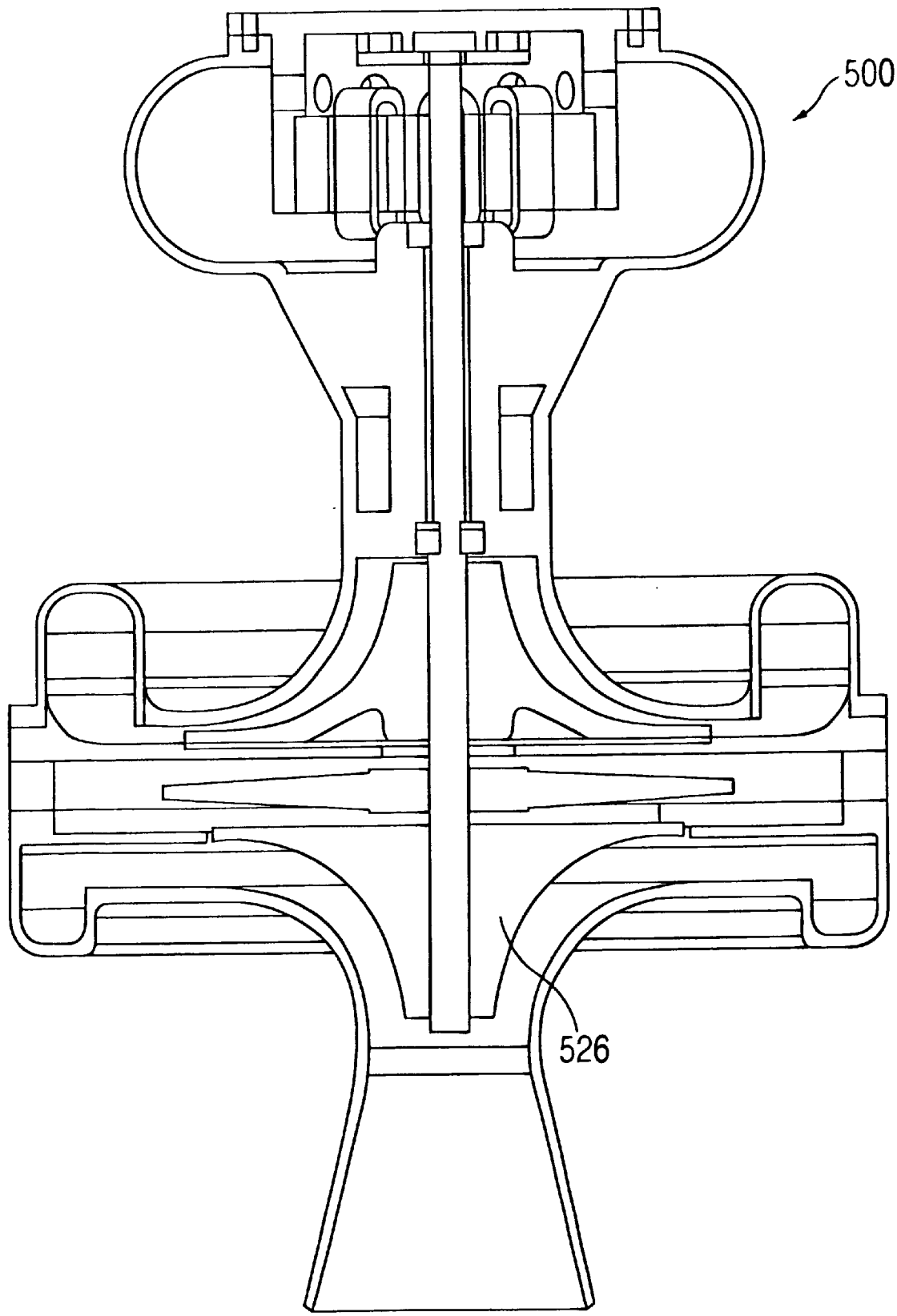
FIG. 5 is a schematic view of another preferred embodiment of the present invention in which another gas turbine and compressor are mounted on a vertical shaft.

FIGS. 4 and 5 show other preferred embodiments of the present invention in high-inertia turbines 400 and 500. Turbines 400 and 500 are similar to the turbines described above with respect to FIGS. 1 and 2, in that the turbines store kinetic energy during periods of inactivity, and that kinetic energy is converted to electrical energy and provided to a load during periods of power degradation or outages. Turbines 400 and 500, however, are different from the previously described turbines in that they are configured vertically, rather than horizontally. Moreover, turbines 400 and 500 also include a shaft-mounted compressor 402 as part of the combustion system which provides working fluid to the turbine. Turbines 400 and 500 may also include an additional flywheel rotor 404 mounted on shaft 406 to provide additional stored kinetic energy.

The only difference between turbines 400 and 500, however, is that turbine 500 includes a blade turbine, while turbine 400 includes a Tesla turbine. while Tesla turbines may provide some advantages over conventional blade turbines, the principles of the inventions described herein are equally applicable to any configuration utilizing a turbine system configured to store kinetic energy, regardless of whether the turbine is a Tesla turbine, a blade turbine, or some other configured turbine. For convenience, only FIG. 4 is described in detail, however, the description therein applied to turbine 500 in FIG. 5 as well. Accordingly, turbine 500 includes shaft-mounted compressor 402 and housing 412, but includes blade turbine 526 instead of Tesla turbine 426.

Turbine 400 provides at least one advantage over the previously described turbines that is directly related to its geometry. By orienting the turbine vertically, axial magnetic bearings 408 may be provided that operate to unload at least a potion of the weight of the rotor. The use of magnetic bearings, in conjunction with conventional mechanical bearings 410, further reduces manufacturing and maintenance costs of turbine 400, while increasing its reliability. A large majority—if not substantially all—of the weight of the rotor is effectively unloaded from the bearings thereby increasing their life. Persons skilled in the art will appreciate that a full five axis magnetic assembly may be used instead of the axial magnetic bearing previously described. A five axis magnetic bearing, while being substantially more expensive than the combination of axial and mechanical bearings, would totally levitate the turbine, electrical machine and compressor (conventional mechanical bearings may also be provided for safety considerations). One of the advantages of levitating the rotary components is that they then may be rotated at higher speeds, as well as the reduction, if not elimination of lubrication requirements.

Housing 412 may easily be evacuated during STANDBY mode, thereby further increasing the efficiency of the device (by reducing energy losses due to, for example, air drag). Further, it should b noted that, in accordance with the present invention, housing 412 may, instead of being evacuated, be purge with a lights gas, such as helium, which would also act to reduce energy losses.

When housing 412 is operated in vacuum, or purged with a light gas, housing 412 also ay include, for example, a solenoid-controlled valve 414 (shown generally in FIG. 4 by arrow 414) located in air intake 416 and a solenoid-controlled valve 418 (shown as a dashed line) located in exhaust 420. The valves may be, for example, solenoid-controlled butterfly valves that completely seal the inlet/outlet they are located in (it may be easier to appreciate valve 414 by viewing FIG. 6—where valve 414 is used to close air inlet 616). When valves 414 and 418 re closed, housing 412 is essentially a sealed u it that can either be evacuated or purged with a light gas (if a combustor is also included, as described below and shown in FIGS. 4–6, additional solenoid valves (not shown) may be required to seal housing 412 from the combustor, or the combustor may simply have its fuel input sealed). During ACTIVE mode, however, air may flow as follows.

Ambient air may be pulled by compressor 402 into air intake 416, so that it reduces he temperature of motor/generator 422, as well as bearings 408 and 410. The compressor in et air may also be used to cool the control electronics (e.g., the power transistors), regardless of whether the electronics are located within the housing of the turbine. This may be particularly desirable during ACTIVE mode, when the power transistors are being used to direct the flow of electricity from the generator to the load. Whether or not the electronics and/or the motor/generator are located within the turbine housing, ducts may be used to direct all or a portion of the cooling air across the electronics on its way into air intake 416. Moreover, the housing may be configured in sections such that the motor/generator and/or control electronics are in the same housing as the turbine, but that each section may be individually evacuated and/or cooled through the use of, for example, valves. Thus, during STANDBY mode, the turbine an compressor section may be evacuated while the motor/generator section is not. In that case, a separate exhaust port may be used in conjunction with a fan to cool the motor/generator during STANDBY mode. Alternatively, the motor/generator may simply be mounted outside of the housing to provide easier methods of easier cooling that component.

The cooling air flows along shaft 406 and enters compressor 402, which acts to compress the air. The compressed air is exhausted from housing 412 via outlet 424 and provided to a combustor (not shown in FIG. 4; see FIG. 6 for an illustration of this routing). The combustor, for example, may mix flammable fluid such as gas with the c pressed air and ignite it to produce combustion products that act as working fluid for the turbine. The combustion products are reintroduced into housing 412 via inlet 428, where they interact with Tesla turbine 426 (or blade turbine 526 in turbine 500) before exiting housing 412 via exhaust 420.

Figure 6:
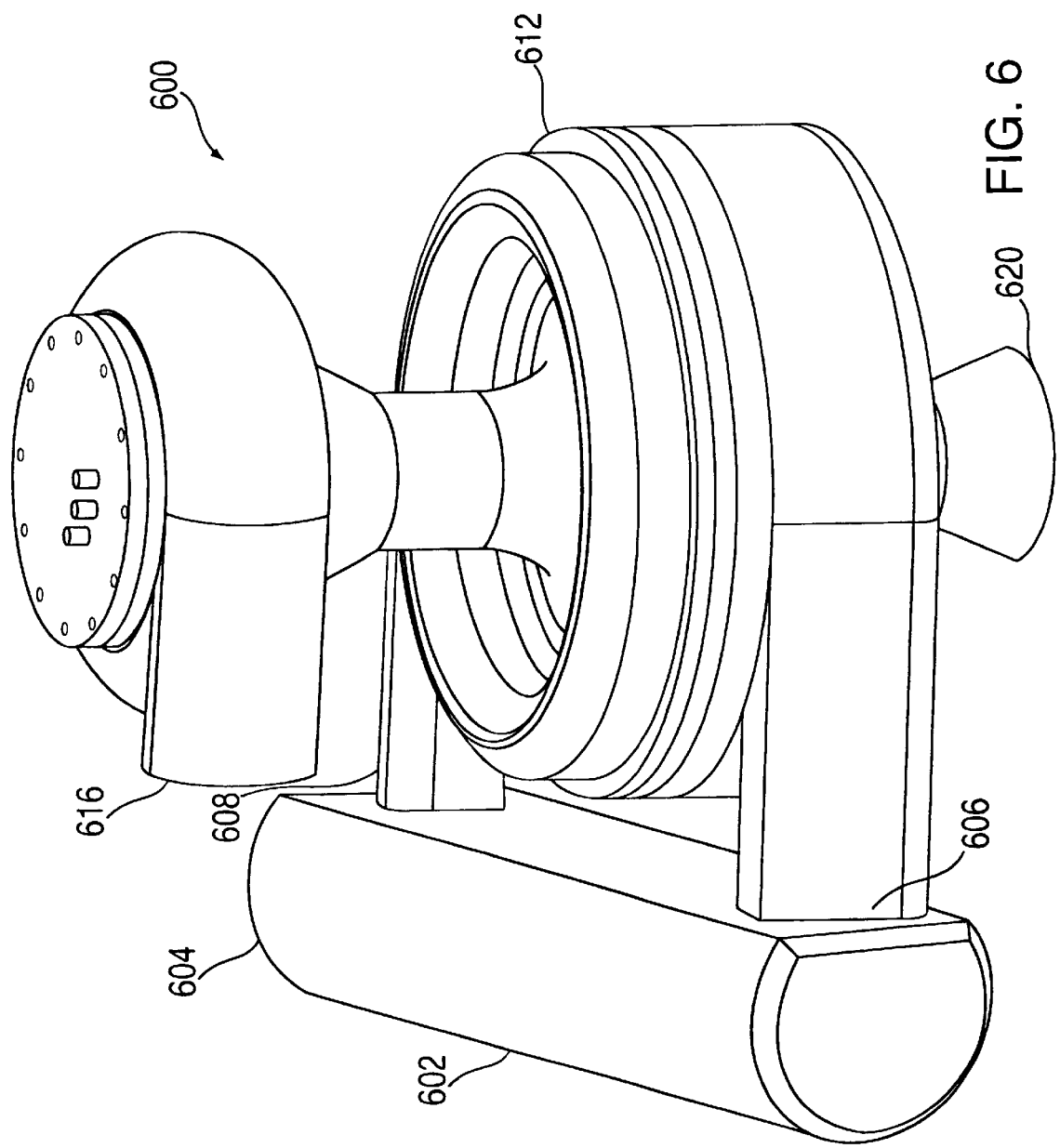
FIG. 6 is a three-dimensional schematic view of a UPS system constructed in accordance with the principles of the present invention in which a gas turbine and compressor are mounted on a vertical shaft.

FIG. 6 shows an external three dimensional view of a gas turbine 600 constructed in accordance with the principles of the present invent on. Gas turbine 600 may include internal component similar to that of gas turbines 400 or 500, or other similar configurations as described herein. For e ample, combustor 602 may be used with either or both of gas turbines 400 and 500. Combustor 602 includes a fuel inlet port 604, an output exhaust port 606 that feeds the gas turbine (see air inlet 428 on FIG. ) with working fluid, and an air inlet port 608 that receives compressed air from compressor 402 (see outlet 424 on FIG. 4).

Housing 612 may, to reduce energy losses during STANDBY mode (i.e., when the turbine is simply spinning at a given speed to maintain a given level of stored kinetic energy), be sealed using standard solenoid valves and either evacuated or purged with a light gas. Solenoid valves at air inlet 616 and exhaust are all that are nee ed to seal housing 612. The operation of gas turbines 400, 500, and 600 is substantially similar to hat previously described with respect to the turbine shown in FIGS. 1–3.

Additionally, any of the gas turbines of the present invention may include, for example, a shaft-mounted, or electrically driven, vacuum pump 430 that could be used to perform the evacuation described herein. Moreover, additional losses due to drag may be reduced or eliminated during STANDBY mode by utilizing a clutch mechanism 432 that decouples the compressor from the shaft during STANDBY mode. In this manner, the compressor will cease to operate, except as needed (of course, control circuitry may be included to begin spinning the compressor up to speed prior to ACTIVE mode, so that power is immediately available). Alternately, an axial magnetic bearing may be used to vary the clearance between the housing and compressor 402 depending on the mode of operation. For example, during STANDBY mode, the clearance between the housing and compressor would be increased to reduce drag, while it would be reduced during ACTIVE mode to increase the operational capability of the compressor.

An additional feature of the present invention may be obtained by spinning th turbine using an external source of motive fluid such as a tank of compressed air during TRANSITIONAL mode. This may extend the time the spinning turbine can generate electricity prior to being driven by more conventional motive products, such as the combustion products previously described. The extended time period increases the reliability and safety of the unit because it increases the amount of time in which the combustor may be ignited. In the instance where ignition fails, the extended TRANSITIONAL mode time gives a user a better opportunity to turn off the critical load or find an alternative source of long term backup power.

It should also be noted that the present invention provides for improved sequencing of valves within the system so that each mode provides a high degree of efficiency and reliability. For example, as described above, during STANDBY mode, the control circuitry may operate to maintain the turbine housing in a vacuum. This may or may not include the motor/generator and/or control electronics. Once TRANSITIONAL mode begins, there are several options. For example, the inlet and outlets may be completely opened, or they may each be partially opened, at the same time while ignition begins. Alternately, the inlet may be opened prior to the exhaust to cause a buildup of pressure so that when the exhaust is opened, additional force acts on the turbine, or just the opposite may occur (i.e., the exhaust is opened first) to reduce the impact of potentially damaging surges of air through the device and/or to obtain a smoother transition to ACTIVE mode. Moreover, once utility power returns, there may exist a need to cool down some or all of the turbine, compressor, housing, motor/generator, control electronics or power electronics. Therefore, during the return to STANDBY mode, in accordance with the present invention, the inlet and exhaust may remain at least partially opened for a limited time. Temperature sensors may be used to determine when to transition to normal STANDBY mode, in which case the housing may be evacuated or purged as described above, and the inlet and exhaust are, appropriately, closed.

Figure 7:
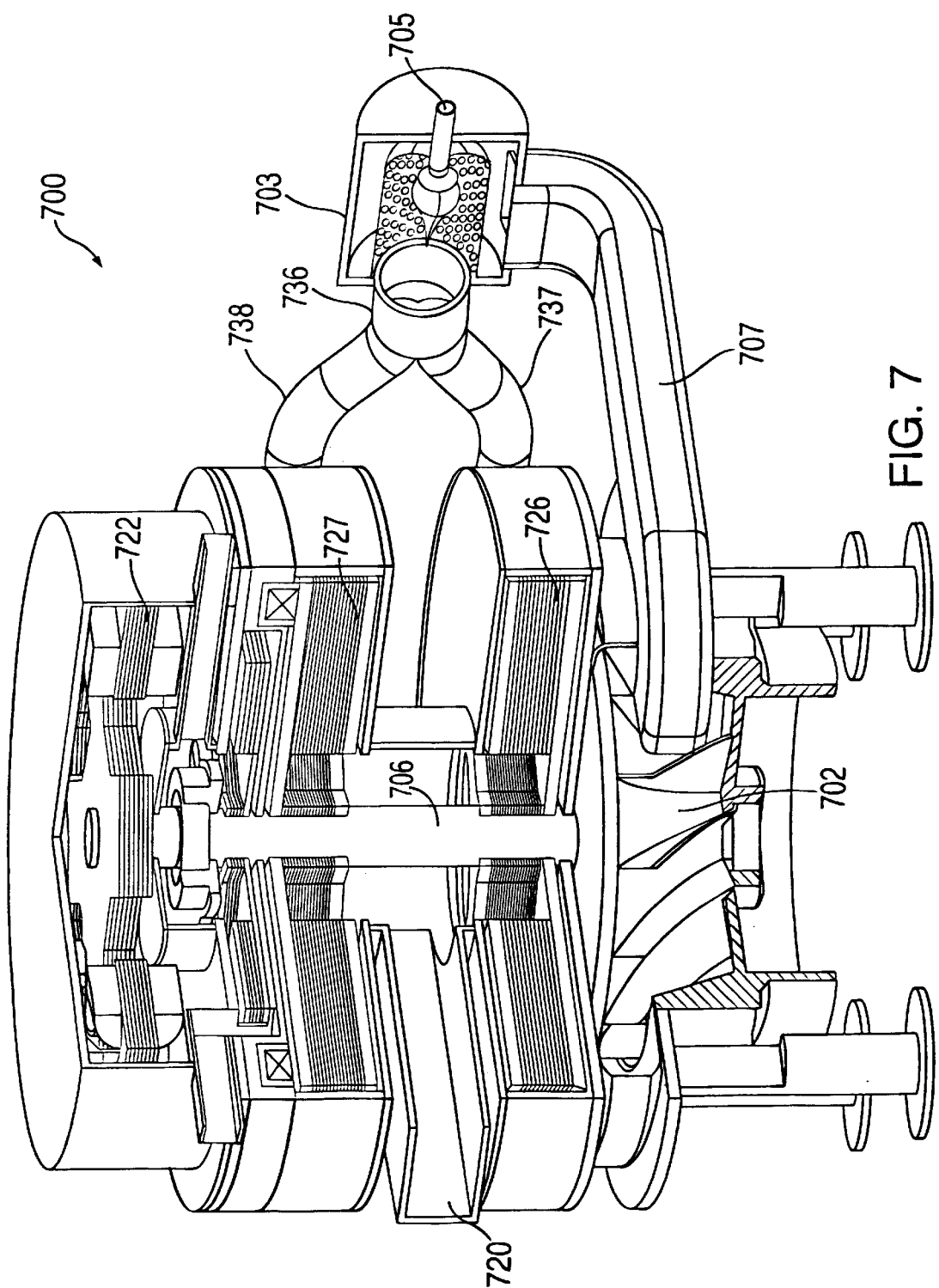
FIG. 7 is a three-dimensional cutaway schematic view of another preferred UPS system constructed in accordance with the principles of the present invention.

FIG. 7 shows another preferred embodiment of the present invention in gas turbine 700. Gas turbine 700, like turbines 400, 500, and 600, is configured along a vertical shaft 706. Turbine 700 includes a compressor 702, motor/generator section 722, and dual power turbines 726 and 727. Turbine 700 also includes combustor 703, which receives fuel through port 705 and compressed air via inlet 707, and provides working fluid to turbine 700 via outlet 736 (which splits into lower conduit 737 and upper conduit 738).

The division of the power section into two portions may provide one or more advantages, depending on the configuration. If the power turbines are configured in two equal sections, thrust load may be significantly reduced—if not effectively eliminated—and the exhaust gases may be routed toward a central exit port 720 to reduce the temperature near the shaft bearings. Persons skilled in the art will appreciate the benefits that are obtained by reducing bearing temperature, such as increased reliability, increased working lifespan of the bearings, the ability to use less expensive bearings due to the less severe operational conditions, etc. Additional alterations may be made to the gas turbines described herein to further reduce the temperature at the bearings. For example, one or more compressor stages or blowers may be added between the power section and the bearings to cool the air before it reaches the bearings.

Figure 11:
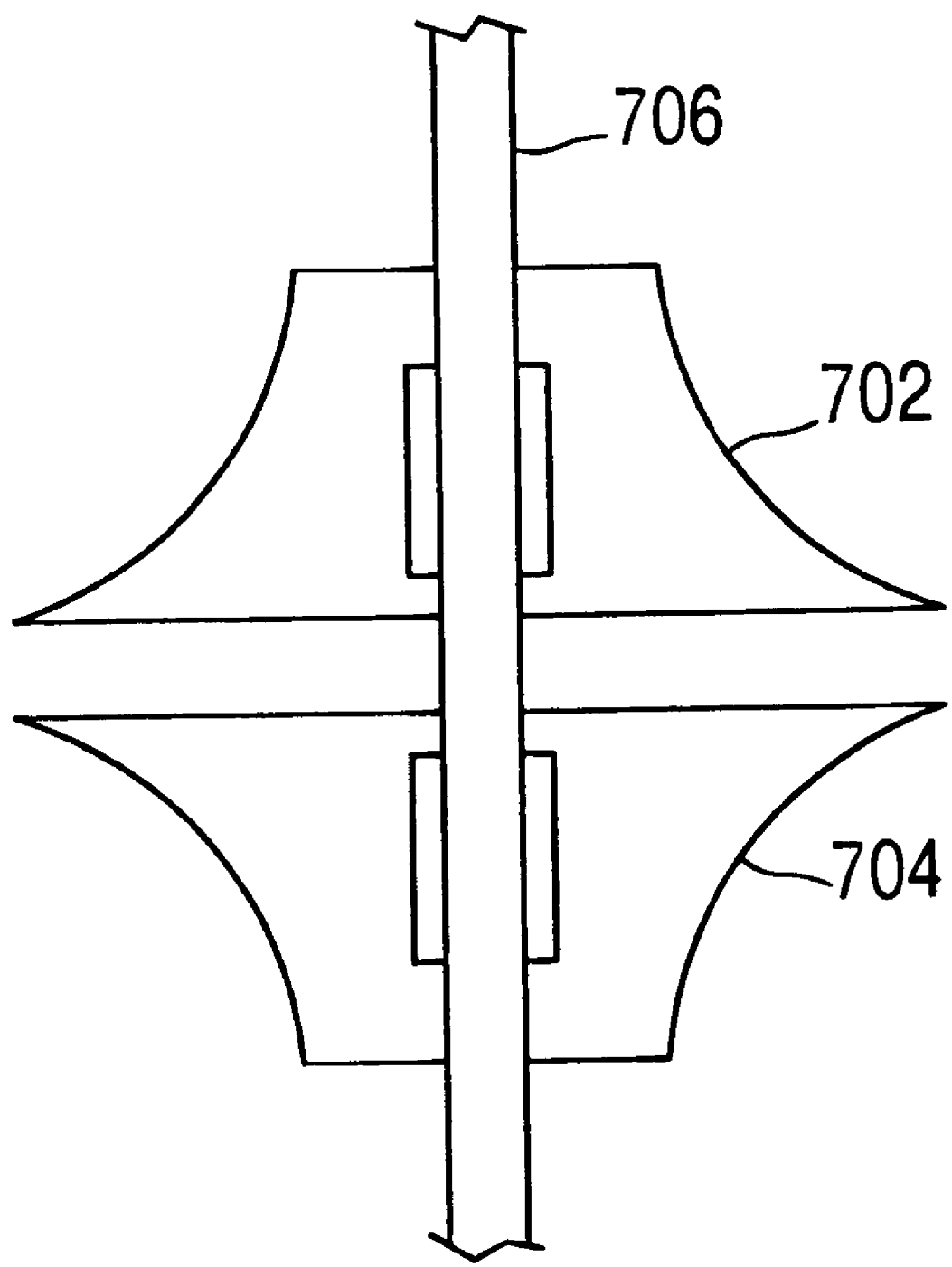
FIG. 11 is a schematic view of a portion of another embodiment of the present invention in which two compressors are mounted on a common shaft.

An alternate configuration for power sections 726 and 727 is that one section provides more thrust than the other section to cancel out the thrust attributable to the compressor, as well as the other power section. Another alternate configuration is that a second compressor (704) is added to counteract the thrust of the first compressor (see FIG. 11) Additionally, the compressors may be configured to cool the shaft between the power sections and the bearings to obtain the benefits described above.

Advantages of utilizing the present invention may be further enhanced by, for example, integrating all of the standard UPS electronics (such as switching electronics) with the control electronics for the gas turbine and combustor systems. This would reduce complexity and costs related to the electronics themselves, as well as eliminate duplicate requirements for system cooling (to cool multiple sets of electronics). Another preferred embodiment of the present invention utilizes an oversized motor/generator section driving an electrical compressor (not shown) instead of a turbine blade compressor (such as compressor 402). The electrical compressor would only be active when needed thereby reducing STANDBY losses (in a fashion similar to the clutch mechanism described above). An additional advantage of an electrical compressor is the decoupling between the turbine/flywheel speed and the compressor speed, which May result in better control of working fluid flow (shaft speed is then irrelevant to the quantity of fluid delivered). Moreover, this would permit the use of off-the-shelf compressors, thereby reducing costs an complexity.

Figure 8:
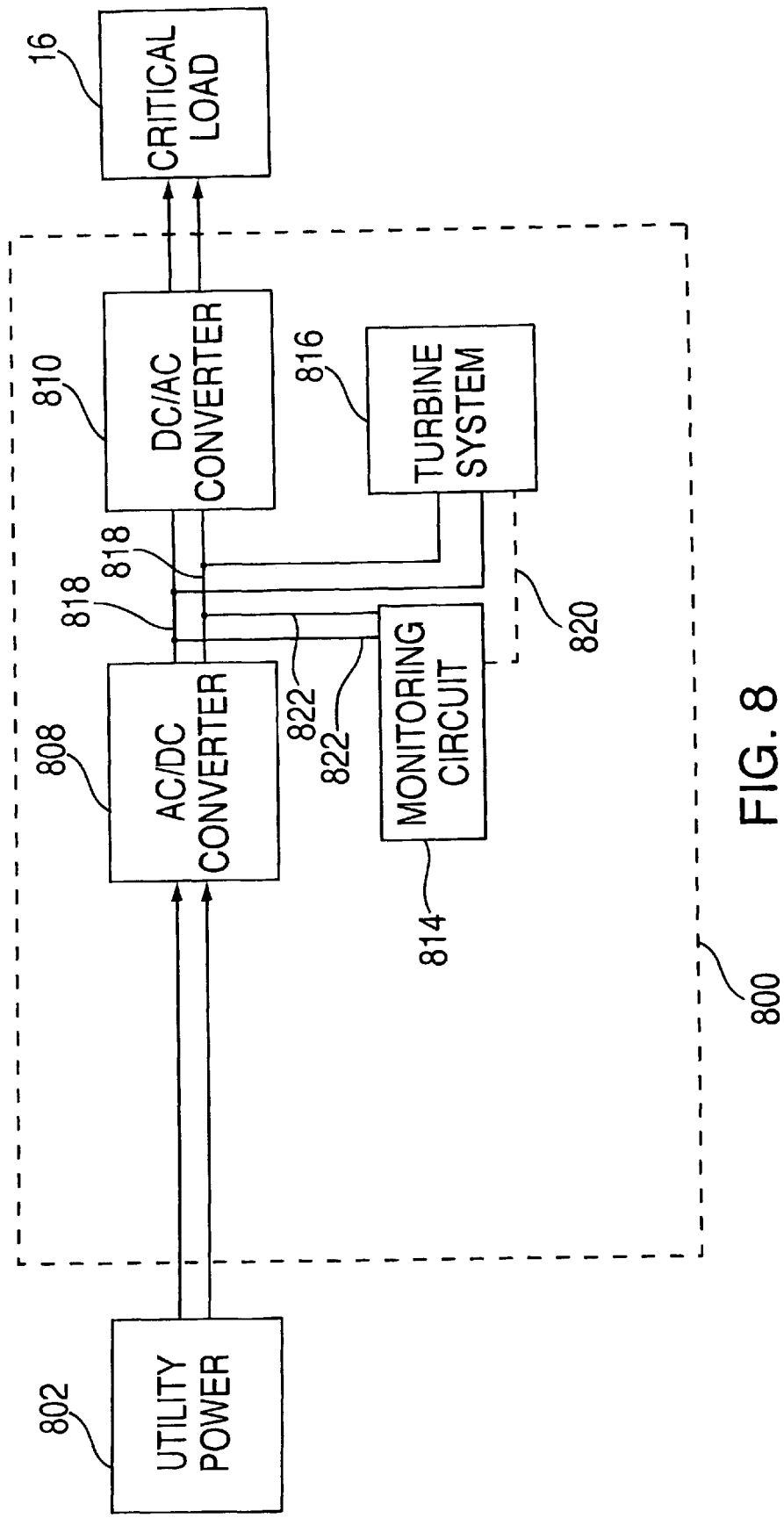
FIG. 8 is a schematic diagram of a double-conversion UPS system constructed in accordance with he principles of the present invention.

FIG. 8 shows an integrated UPS 800 constructed in accordance with the present invention. UPS 800 is connected between utility power source 802, which may simply be power supplied from a utility company, and critical load 16 (see, for example, FIG. 1). Critical load 16 represents any one of several different applications in which a continuous supply of power is critical, such as the aforementioned airport, hospital, etc. UPS 800 provides backup power to critical load 16 in the event that utility power source 802 fails, or otherwise falls below a given predetermined threshold (for example, when the output waveform does not meet a given specification, even though utility power is still available).

UPS 800 includes an AC-to-DC converter 808, a DC-to-AC converter 810, a monitoring circuit 814, and a turbine system 816 (which may include, for example, any of the previously described turbine systems, any combination thereof, any combination of the additional features described herein, or any other turbine system provided that kinetic energy from the turbine system is utilized to generate and provide electrical energy to the critical load). AC-to-DC converter 808 takes the AC power provided by utility power source 802 and converts it to DC power. Converter 808 may be a simple rectifier circuit, or it may be any other conventional circuit that is used to convert power from AC to DC as long as the proper power levels are maintained. The DC power is fed across DC bus 818 to DC-to-AC converter 810, which converts it back to AC power.

Converter 810 may be a simple inverter circuit, or it may be any other conventional circuit used to convert power from DC to AC. Persons skilled in the art will appreciate that when critical load 16 requires DC power, DC to AC converter 810 is not required. Under those circumstances, DC buss 818 may directly feed critical load 16 (protective circuitry (not shown) may be used between buss 818 and critical load 16 to protect load 16 from upstream failures, and to protect UPS 800 from failures at load 16). Moreover, one or more DC to DC converters may be used between DC buss 818 and load 16 to vary the level of DC voltage provided to load 16. In addition, some circumstances may require both DC to AC converter 810 and one or more DC outputs depending on load 16.

DC buss 818 may be monitored by monitoring circuit 814 through lines 822 (while monitoring circuit 814 is only shown to receive signals indicative of the status of DC buss 9 818, additional "utility power failure" input signals may be received by monitoring the input to AC-to-DC converter 808 and/or the output from DC-to-AC converter 810). Once a utility power failure has been detected, monitoring circuit 814 sends signals along line 820 that may cause backup power to be supplied to critical load 16 from turbine system 816 (in which case combustion products would be introduced into the turbine to drive it). Turbine system 816 also supplies DC power to DC buss 818 as soon as the voltage on DC buss 818 drops below a predetermined level via the kinetic energy stored in the turbine rotor (as previously described). Turbine system 816 continues to supply power to buss 818 from stored kinetic energy until either the kinetic energy stored therein is drained or until adequate power is being supplied to critical load 16 from, for example, utility power source 802 or turbine system 816 operating as a turbine—a signal on line 820 triggers turbine system 816 to begin a powerup cycle).

From the foregoing description, persons skilled in the art will recognize that this invention provides effective, uncomplicated, low maintenance, and relatively inexpensive ways of providing an uninterrupted supply of electrical power to a critical load. It will also be recognized that the invention may take many forms other than those disclosed in this specification. Accordingly, it is emphasized that the invention is not limited to the disclosed methods and apparatuses, but is intended to include variations to and modifications thereof which are within the spirit of the following claims.

We claim:

1. An uninterruptible power supply (UPS) that receives primary power from a primary power source and supplies power to a critical load, said UPS being operable in modes comprising STANDBY, TRANSITIONAL and ACTIVE modes, said UPS comprising:

a housing that is sealed CLOSED during STANDBY mode, and OPEN during ACTIVE mode;

a rotary electrical machine having a machine rotor, said electrical machine being electrically connectable to said primary power source and being operable as a motor during STANDBY mode when it receives electric power from said primary power source, and in GENERATOR mode to supply power to said critical load during TRANSITIONAL and ACTIVE modes; and a turbine, mounted in said housing, having a turbine rotor and a normally inactive fluid supply which, during ACTIVE mode, supplies a flow of motive fluid to said turbine rotor to rotate said turbine rotor which rotates said machine rotor, said turbine rotor being driven by said machine rotor during STANDBY mode to store kinetic energy, said kinetic energy being used, during TRANSITIONAL mode, to drive said machine rotor.

2. The UPS of claim 1, wherein said electrical machine is mounted within said housing.

3. The UPS of claim 1, wherein said electrical machine is mounted external to said housing.

4. The UPS of claim 1, wherein said housing is evacuated during STANDBY mode.

5. The UPS of claim 4 wherein a portion of said housing is evacuated during ACTIVE mode while motive fluid is introduced into the portion of said housing where said turbine is located.

6. The UPS of claim 5, further comprising:
a compressor mounted within a portion of said housing in which air is introduced during ACTIVE mode.

7. The UPS of claim 1, wherein said housing is purged with a light gas during STANDBY mode.

8. The UPS of claim 7, wherein a portion of said housing is purged with a light gas during ACTIVE mode while motive fluid is introduced into the portion of said housing where said turbine is located.

9. The UPS of claim 8, further comprising:
a compressor mounted within a portion of said housing in which air is introduced during ACTIVE mode.

10. The UPS of claim 1, wherein said electrical machine is mounted within said housing, and said electrical machine and turbine are in separate housing sections within said housing such that said turbine section may be independently evacuated during STANDBY mode.

11. The UPS of claim 1, wherein said electrical machine is mounted within said housing, and said electrical machine and turbine are in separate housing sections within said housing such that said turbine section may be independently purged with a light gas during STANDBY mode.

12. The UPS of claim 1, wherein said motive fluid is an exhaust gas, said UPS further comprising:
a combustion chamber where fuel is burned to produce said exhaust gas.

13. The UPS of claim 1, wherein said motive fluid is steam.

14. The UPS of claim 1, wherein said motive fluid is pressurized gas.

15. The UPS of claim 1, further comprising:
a controller that activates said fluid supply after a failure of said primary power source is detected.

16. The UPS of claim 1, further comprising:
a controller that activates said fluid supply if power from said primary power source falls below a predetermined threshold.

17. The UPS of claim 1, further comprising:
a controller that connects said electrical machine to said critical load if power from said primary power source falls below a predetermined threshold.

18. The UPS of claim 1, further comprising:
a controller that disconnects said primary power source if a failure of said primary power source is detected.

19. The UPS of claim 1, further comprising:
power electronics having an input that receives power from said electrical machine at a variable frequency which is a function of the rotational velocity of said machine rotor, said power electronics having an output that supplies electric power as DC or constant frequency AC to said critical load.

20. The UPS of claim 1, further comprising:
power electronics having an input that receives power from said electrical machine at a variable frequency which is a function of the rotational velocity of said machine rotor, said power electronics having an output that supplies electric power as DC and constant frequency AC to said critical load.

21. The UPS of claim 1, further comprising:
a flywheel connected to said turbine rotor.

22. The UPS of claim 1, further comprising:
a flywheel that is rotated at the same angular velocity as said turbine rotor, said angular velocity being greater than zero in all operational modes.

23. The UPS of claim 1, wherein said electrical machine is rotated at the same angular velocity as said turbine rotor, said angular velocity being greater than zero in all operational modes.

24. The UPS of claim 1, wherein said housing is OPEN during TRANSITIONAL mode.

25. The UPS of claim 1, wherein said housing comprises:
a body;
an inlet; and
an exhaust.

26. The UPS of claim 25, wherein said inlet is OPEN during TRANSITIONAL mode and said exhaust is CLOSED during at least a portion of TRANSITIONAL mode.

27. The UPS of claim 25, wherein said inlet and said exhaust are OPEN during TRANSITIONAL mode.

28. The UPS of claim 25, wherein said inlet and said exhaust are only partially OPEN during TRANSITIONAL mode.

29. The UPS of claim 25, wherein said inlet is OPEN and said exhaust is partially OPEN while said UPS goes from ACTIVE mode back to STANDBY mode.

30. The UPS of claim 25, wherein said inlet and exhaust are OPEN while said UPS goes from ACTIVE mode back to STANDBY mode.

31. The UPS of claim 25, wherein said inlet is partially OPEN and said exhaust is OPEN while said UPS goes from ACTIVE mode back to STANDBY mode.

32. The UPS of claim 25, wherein said inlet and exhaust are partially OPEN while said UPS goes from ACTIVE mode back to STANDBY mode.

33. The UPS of claim 25 further comprising:
control electronics that are cooled by ambient air passing on its way to said inlet during ACTIVE mode.

34. The UPS of claim 25 further comprising:
power electronics that are cooled by ambient air passing on its way to said inlet during ACTIVE mode.

35. The UPS of claim 25 further comprising:
control electronics that control at least the sequencing of air flow through the inlet and exhaust; and
power electronics that switch the supply of power to said critical load between said primary source and said electrical machine, said power electronics being integrated with said control electronics such that said control electronics and said power electronics utilize at least some common circuitry.

36. The UPS of claim 35, wherein:
said integrated control and power electronics are cooled by ambient air passing on its way to said inlet during ACTIVE mode.

37. The UPS of claim 25, wherein, said electrical machine is cooled by ambient air passing on its way to said inlet during ACTIVE mode.

38. The UPS of claim 1, further comprising:
a source of compressed gas that powers said turbine during TRANSITIONAL mode.

39. The UPS of claim 38, wherein said source of compressed gas is a tank of compressed air.

40. An uninterruptible power supply (UPS) that receives power from a primary power source and supplies power to a critical load, said UPS comprising:
a housing;
a rotary electrical machine having a machine rotor and the capability to operate in GENERATOR and MOTOR modes, said machine operating in MOTOR mode when supplied with electric power from the primary power source; and
a turbine mounted in said housing and having a turbine rotor that is drivingly connected to said machine rotor, said turbine having a normally inactive fluid supply which, when ACTIVE, supplies motive fluid to rotate said turbine rotor, said turbine rotor being rotated by said machine when said machine is in said MOTOR mode to store kinetic energy as rotational momentum of said turbine rotor, said UPS being operable in EMERGENCY mode where said machine rotor is rotatational momentum of said turbine rotor to operate said machine in GENERATOR mode to supply electric power to said critical load.

41. The UPS of claim 40, wherein said electrical machine is mounted in said housing.

42. The UPS of claim 40, wherein said electrical machine is mounted external to said housing.

43. The UPS of claim 40, wherein said housing is evacuated during STANDBY mode.

44. The UPS of claim 40, wherein said housing is purged with a light gas during STANDBY mode.

45. The UPS of claim 40, wherein said fluid supply is activated when said UPS is operating in EMERGENCY mode.

46. The UPS of claim 40, wherein said machine includes a single set of windings that enable said machine to operate in both MOTOR and GENERATOR modes.

47. The UPS of claim 40, wherein machine includes generator windings to operate in GENERATOR mode and separate motor windings to operate in MOTOR mode, said machine being operable in NON-EMERGENCY mode where it receives power from an electrical distribution system and said machine rotor rotates said turbine rotor, said NON-EMERGENCY mode rotation of said machine rotor causing said generator windings to provide power to said critical load during NON-EMERGENCY mode.

48. The UPS of claim 40 further comprising:
a flywheel connected to said turbine rotor.

49. The UPS of claim 40 further comprising:
a flywheel that is rotated at a same angular velocity as said turbine rotor, said angular velocity being greater than zero in all operational modes.

50. The UPS of claim 40, wherein said electrical machine is rotated at the same angular velocity as said turbine rotor, said angular velocity being greater than zero in all operational modes.

51. An uninterruptible power supply (UPS) that receives primary power from a primary power source and supplies power to a critical load, said UPS being operable in STANDBY, TRANSITIONAL and ACTIVE modes, said UPS comprising:

a rotary electrical machine having a machine rotor mounted to a vertically-mounted shaft, said electrical machine being electrically connectable to said primary power source and being operable as a motor during STANDBY mode when it receives electric power from said primary power source, and in GENERATOR mode to supply o said critical load during TRANSITIONAL and ACTIVE modes;
a compressor mounted to said shaft that provides compressed air to said UPS; and
a turbine having a turbine rotor mounted to said shaft and a normally inactive fluid supply which, during ACTIVE mode, supplies a flow of motive fluid to said turbine rotor which rotates said turbine rotor and thereby also rotates said machine rotor, said turbine rotor being driven by said machine rotor during STANDBY mode to store kinetic energy, said kinetic energy being used, during TRANSITIONAL mode, to drive said turbine rotor which drives said machine rotor.

52. The UPS of claim 51 further comprising:
at least one axial magnetic bearing mounted to said shaft, said magnetic bearing operating to unload at least a portion of the weight of said turbine rotor, said machine rotor, and said compressor; and
a plurality of conventional bearings mounted to said shaft.

53. The UPS of claim 52, wherein said magnetic bearing unloads a substantial majority of the weight of said turbine rotor, said machine rotor, and said compressor.

54. The UPS of claim 51 further comprising:
a five-axis magnetic bearing assembly, said magnetic bearing assembly operating to unload all of the weight of said turbine rotor, said machine rotor, and said compressor, such that said rotors and said compressor are levitated.

55. The UPS of claim 51 further comprising:
a sealable housing, said machine, said turbine, and said compressor all being mounted within said housing, said housing being sealed CLOSED during STANDBY mode, and being OPEN during at least a part of said TRANSITIONAL and ACTIVE modes.

56. The UPS of claim 55, wherein said housing is evacuated during STANDBY mode.

57. The UPS of claim 51 further comprising:
a shaft-mounted vacuum pump.

58. The UPS of claim 51 further comprising:
an electrically-driven vacuum pump.

59. The UPS of claim 55, wherein said compressor is used to evacuate said housing.

60. The UPS of claim 55, wherein said housing is purged with a light gas during STANDBY mode.

61. The UPS of claim 55, wherein said machine rotor is mounted at a distal end of said shaft in a distal end of said housing, said housing having an air intake at said distal end to which cooling air is introduced to reduce the operating temperature of said electrical machine.

62. The UPS of claim 51 further comprising:
a clutch mechanism that decouples said compressor from said shaft during STANDBY mode.

63. The UPS of claim 55 further comprising:
at least one axial magnetic bearing that operates to vary clearance between said housing and said compressor such that said clearance is reduced during ACTIVE mode and increased during STANDBY mode.

64. The UPS of claim 51, wherein said supply of motive fluid comprises a combustor that receives compressed air from said compressor and converts said compressed air to motive fluid.

65. The UPS of claim 51 further comprising:
control circuitry that controls said electrical machine and said turbine, said control circuitry being integrated with standard UPS electronics.

66. The UPS of claim 51 further comprising:
a second compressor configured to counteract thrust of said compressor, said compressor and said second compressor being mounted to said shaft.

67. An uninterruptible power supply (UPS) that receives primary power from a primary power source and supplies power to a critical load, said UPS being operable in STANDBY, TRANSITIONAL and ACTIVE modes, said UPS comprising:
a rotary electrical machine having a machine rotor mounted to a vertically-mounted shaft, said electrical machine being electrically connectable to said primary power source and being operable as a motor during STANDBY mode when it receives electric power from said primary power source, and in GENERATOR mode to supply power to said critical load during TRANSITIONAL and ACTIVE modes;
a compressor mounted to said shaft that provides compressed air to said UPS; and
a turbine having first and second turbine rotors mounted to said shaft and a normally inactive fluid supply which, during ACTIVE mode, supplies a flow of motive fluid to said turbine rotors which rotates said turbine rotors and thereby also rotates said machine rotor, said turbine rotors being driven by said machine rotor during STANDBY mode to store kinetic energy, said kinetic energy being used, during TRANSITIONAL mode, to drive said turbine rotors which drives said machine rotor.

68. The UPS of claim 67, wherein said first and second turbine rotors are configured in equal sections to reduce thrust load.

69. The UPS of claim 67, wherein said first and second turbine rotors are configured in unequal sections such that one thrust of one turbine rotor offsets the thrust of the other turbine rotor and the thrust of the compressor.

70. A method of reducing losses in an uninterruptible power supply (UPS) that operates in STANDBY, TRANSITIONAL and ACTIVE modes, said UPS receiving power from a primary power source, said UPS including a rotary electrical machine that operates in GENERATOR and MOTOR modes, said machine having a machine rotor, and a turbine having a turbine rotor drivingly connected to said machine rotor, said turbine having a normally inactive fluid supply that, during ACTIVE mode, supplies motive fluid to rotate said turbine rotor, said machine and said turbine being mounted in a sealable housing, said method comprising:
supplying power, during STANDBY mode, from said primary power source to said machine which, when in MOTOR mode, rotates said turbine rotor and thereby stores kinetic energy as rotational momentum;
operating said UPS in TRANSITIONAL mode where said machine rotor is rotated by said rotational momentum, said machine operating in GENERATOR mode to supply electric power to a critical load; and
evacuating said housing during STANDBY mode.

71. A method of reducing losses in an uninterruptible power supply (UPS) that operates in STANDBY, TRANSITIONAL and ACTIVE modes, said UPS receiving power from a primary power source, said UPS including a rotary electrical machine that operates in GENERATOR and MOTOR modes, said machine having a machine rotor, and a turbine having a turbine rotor drivingly connected to said machine rotor, said turbine having a normally inactive fluid supply that, during ACTIVE mode, supplies motive fluid to rotate said turbine rotor, said machine and said turbine being mounted in a sealable housing, said method comprising:
supplying power, during STANDBY mode, from said primary power source to said machine which, when in MOTOR mode, rotates said turbine rotor and there by stores kinetic energy as rotational momentum;
operating said UPS in TRANSITIONAL mode where said machine rotor is rotated by said rotational momentum, said machine operating in GENERATOR mode to supply electric power to a critical load; and
purging said housing with a light gas during STANDBY mode.

72. A method of reducing losses in an uninterruptible power supply (UPS) that operates in STANDBY, TRANSITIONAL and ACTIVE modes, said UPS receiving power from a primary power source, said UPS including a rotary electrical machine t hat operates in GENERATOR and MOTOR modes, said machine having a machine rotor, and a turbine having a turbine rotor drivingly connected to said machine rotor, said turbine having a normally inactive fluid supply that, during ACTIVE mode, supplies motive fluid to rotate said turbine rotor, said machine and said turbine being mounted in a sealable housing, said method comprising:
supplying power, during STANDBY mode, from said primary power source to said machine which, when in MOTOR mode, rotates said turbine rotor and thereby stores kinetic energy as rotational momentum;
operating said UPS in TRANSITIONAL mode where said machine rotor is rotated by said rotational momentum, said machine operating in GENERATOR mode to supply electric power to a critical load; and
using at least one axial magnetic bearing to unload at least a portion of the weight of said machine rotor and said turbine rotor.

73. A method of reducing losses in an uninterruptible power supply (UPS) that operates in STANDBY, TRANSITIONAL and ACTIVE modes, said UPS receiving power from a primary power source, said UPS including a rotary electrical machine mounted to a shaft that operates in GENERATOR and MOTOR modes, said machine having a machine rotor, a compressor mounted to said shaft, and a turbine mounted to said shaft having a turbine rotor drivingly connected to said machine rotor, said turbine having a normally inactive fluid supply that, during ACTIVE mode, supplies motive fluid to rotate said turbine rotor, said machine and said turbine being mounted in a sealable housing, said method comprising:
supplying power, during STANDBY mode, from said primary power source to said machine which, when in MOTOR mode, rotates said turbine rotor and thereby stores kinetic energy as rotational momentum;
operating said UPS in TRANSITIONAL mode where said machine rotor is rotated by said rotational momentum, said machine operating in GENERATOR mode to supply electric power to a critical load; and
utilizing a clutch mechanism to decouple said compressor from said shaft during STANDBY mode.

* * * * *

UNITED STATES PATENT AND TRADEMARK OFFICE
CERTIFICATE OF CORRECTION

PATENT NO. : 6,512,305 B1
DATED : January 28, 2003
INVENTOR(S) : Joseph F. Pinkerton et al.

It is certified that error appears in the above-identified patent and that said Letters Patent is hereby corrected as shown below:

Title page,
Item [56], References Cited, FOREIGN PATENT DOCUMENTS, change
"JP 0 734 113" to -- EP 0 734 113 --;

Column 1,
Line 36, change "whet" to -- when --;

Column 3,
Line 32, change "momentum," to -- momentum --;

Column 4,
Line 40, change "with he" to -- with the --;
Line 62, change "machines B" to -- machines 8 --;

Column 5,
Line 29, change "An" to -- in --;

Column 7,
Line 15, change "turbine 211" to -- turbine 2" --;

Column 8,
Line 22, change "turbine. while Tesla" to -- turbine. While Tesla --;
Line 29, change "detail," to -- detail; --;
Line 30, change "applied" to -- applies --;
Line 38, change "potion" to -- portion --;
Line 59, change "should b" to -- should be --;
Line 61, change "be purge with a lights gas" to -- be purged with a light gas --;
Line 64, change "also ay" to -- also may --;

Column 9,
Line 5, change "re closed, 10" to -- are closed, --;
Line 6, change "u it" to -- unit --;
Line 14, change "reduces he" to -- reduces the --;
Line 16, change "in et air" to -- inlet air --;
Line 30, change "turbine an" to -- turbine and --;
Line 42, change "c pressed" to -- compressed --;
Line 50, change "invent on." to -- invention. --;
Line 51, change "component" to -- components --;
Lines 52-53, change "e ample," to -- example, --;

UNITED STATES PATENT AND TRADEMARK OFFICE
CERTIFICATE OF CORRECTION

PATENT NO.     : 6,512,305 B1
DATED          : January 28, 2003
INVENTOR(S)    : Joseph F. Pinkerton et al.

It is certified that error appears in the above-identified patent and that said Letters Patent is hereby corrected as shown below:

Column 9 cont'd,
Line 56, change "FIG. )" to -- FIG. 4) --;
Line 64, change "nee ed" to -- needed --;
Line 66, change "hat" to -- that --;

Column 10,
Line 20, change "th turbine" to -- the turbine --;

Column 11,
Line 42, change "May" to -- may --;
Line 45, change "an complexity" to -- and complexity --;

Column 12,
Line 23, change "9 818" to -- 818 --;

Column 15,
Lines 26-27, change "is rotatational" to -- is rotated by rotational --;

Column 16,
Line 7, change "supply o said" to -- supply power to said --;

Column 18,
Line 10, change "there by" to -- thereby --; and
Line 22, change "t hat" to -- that --.

Signed and Sealed this

Seventh Day of October, 2003

JAMES E. ROGAN
*Director of the United States Patent and Trademark Office*